United States Patent [19]

Larsen et al.

[11] 4,248,042
[45] Feb. 3, 1981

[54] ENGINE THRUST CONTROL SYSTEM
[75] Inventors: Hals N. Larsen, Redmond, Wash.;
Peter W. Kamber, Hawi, Hi.
[73] Assignee: The Boeing Company, Seattle, Wash.
[21] Appl. No.: 957,639
[22] Filed: Nov. 3, 1978
[51] Int. Cl.³ .......................... F02K 3/06; F02C 9/08
[52] U.S. Cl. ..................................................... 60/243
[58] Field of Search ................................. 60/236, 243

[56] References Cited
U.S. PATENT DOCUMENTS

| 3,797,233 | 3/1974 | Webb et al. | 60/236 |
| 3,854,287 | 12/1974 | Rembold | 60/236 |
| 4,159,625 | 7/1979 | Kerr | 60/243 |

Primary Examiner—Robert E. Garrett
Attorney, Agent, or Firm—Lynn H. Hess; Bernard A. Donahue

[57] ABSTRACT

A control system and method for utilizing the rotational speed of the high-speed spool in a multi-spool turbofan engine to stabilize changes in engine operation which affect the thrust output of the engine. Signals representing the actual rotational speed of the high-speed spool, the actual value of the selected engine pressures which provide an accurate measure of engine thrust, and a commanded value of the selected engine pressures are processed; and an error signal is provided in response to these three signals which is a function of all three signals. The error signal is then used to control the rate of fuel flow to the engine which, in turn, controls engine thrust. In one embodiment the error signal is a function of the rotational speed of the high-speed spool and the actual and commanded values of engine pressure ratio, and in another embodiment the error signal is a function of the rotational speed of the high-speed spool and the actual and commanded values of integrated engine pressure ratio.

28 Claims, 5 Drawing Figures

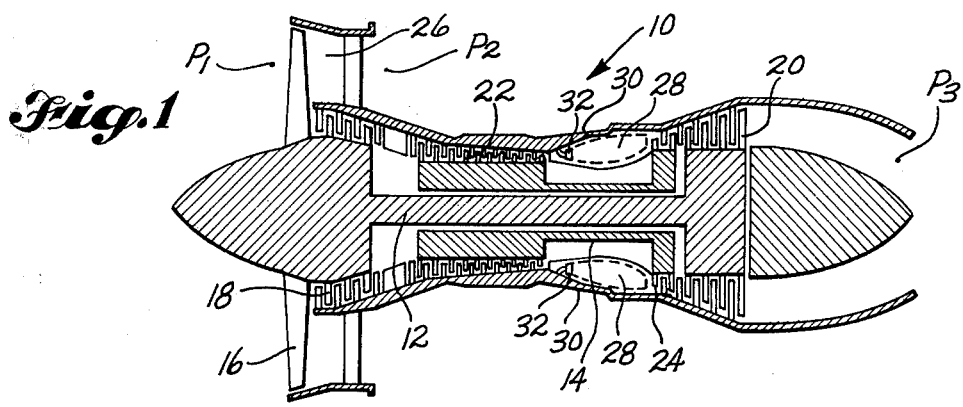
Fig. 1
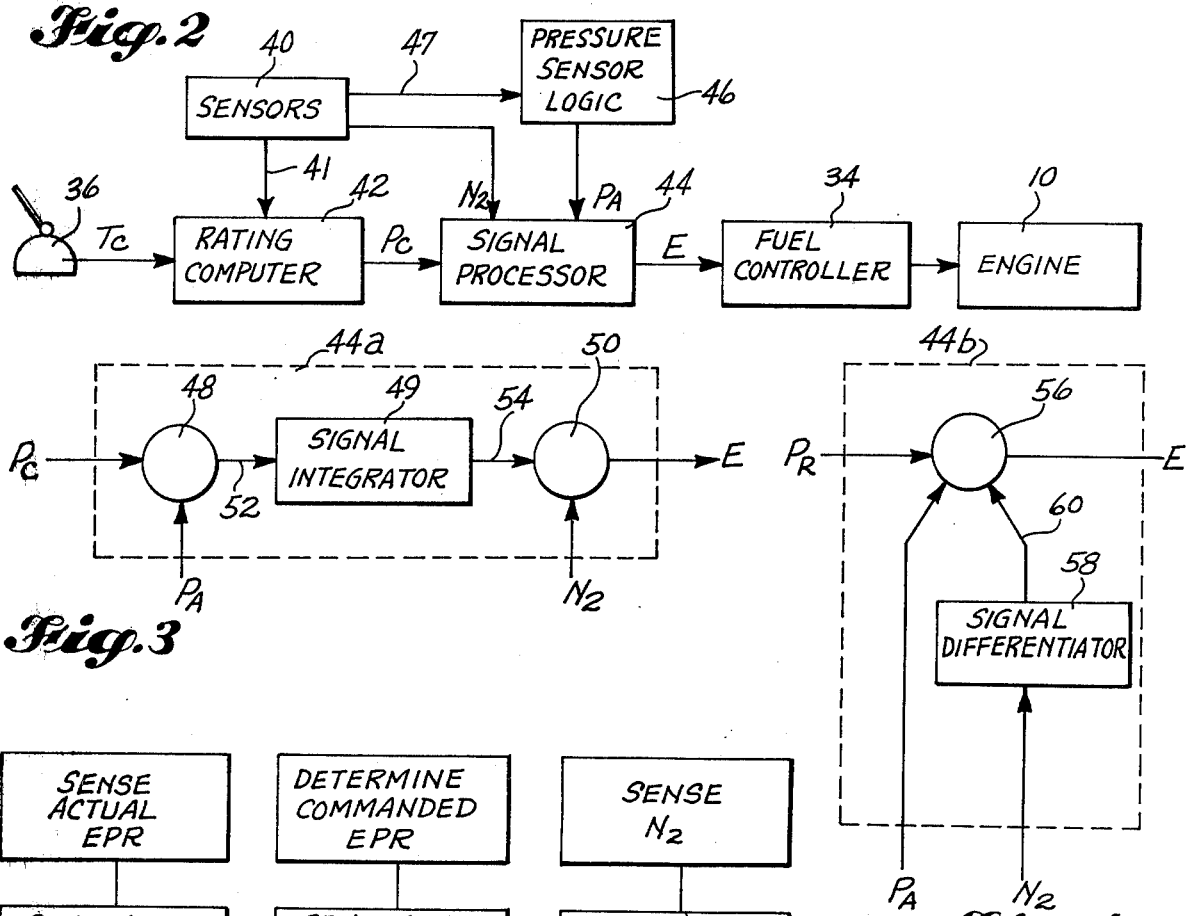
Fig. 2
Fig. 3
Fig. 4
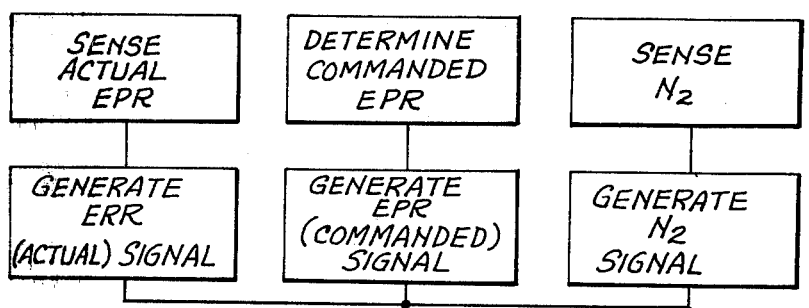
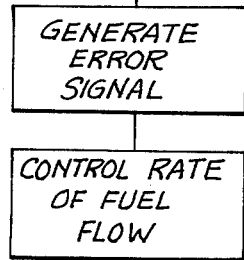
Fig. 5

ENGINE THRUST CONTROL SYSTEM

BACKGROUND OF THE INVENTION

This invention relates to control systems and methods for controlling the thrust of a multi-spool turbofan engine.

In controlling the thrust of a multi-spool turbofan engine and especially in causing selected changes in the thrust output of such an engine, it is important that a thrust control system provide both accuracy and stability. Providing acceptable accuracy and stability in such controls has been a problem of long standing in the art.

The accuracy and stability of thrust control is determined in large part by feedback signals from the engine and by the treatment of these signals by the thrust control system. One approach to stabilizing the operation of a two spool turbofan engine has been to monitor the difference between the actual rotational speed of the high-speed spool and a selected rotational speed for the high-speed spool and then control fuel flow to the engine in response to this difference. However, it is known that certain engine pressure-related parameters are more directly related to, and are much better indicators of, engine thrust than is the speed of the high-speed spool; and it is therefore more advantageous, in terms of accuracy, to utilize engine parameters such as engine pressure ratio (EPR) or integrated engine pressure ratio (IEPR) to control engine operation.

Unfortunately, in a multi-spool turbofan engine there is more inertia associated with engine pressure parameters such as EPR and IEPR than there is with the speed of the high-speed spool, so that although accuracy is improved with the use of parameters such as EPR and IEPR there is also some loss of stability. In addition, the pressure signals used to determine values of the relevant pressure-related parameters usually include an element of noise which must be filtered out, and the filtering step further delays response time and has a negative impact on thrust control stability. Thus, it has been necessary in the past to sacrifice one of either accuracy or stability in order to improve the other, and engine thrust control systems have not afforded the combination of accuracy and stability to the degree desired in the environment of modern jet aircraft.

SUMMARY OF THE INVENTION

It is therefore an object of the present invention to provide, for a multi-spool turbofan engine, the control of engine thrust with a high degree of both accuracy and stability.

In accordance with the system and method of the present invention a thrust command signal is provided in terms of the value of a pressure-related parameter and is processed together with feedback signals representing the actual values of the pressure-related parameter and the rotational speed of the high-speed spool respectively. An error signal is then provided which is a function of all three signals; and this error signal controls fuel flow to, and thus the thrust of, a multi-spool turbofan engine.

The novel features characteristic of the present invention, together with other objects and advantages thereof, will be better understood from the following detailed description and accompanying drawings which together disclose preferred embodiments of the invention.

BRIEF DESCRIPTION OF THE DRAWINGS

FIG. 1 is a side sectional view of a two spool turbofan engine;

FIG. 2 is a block schematic diagram of the control system of the present invention;

FIG. 3 is a block schematic diagram of one embodiment of a signal processor in accordance with the invention;

FIG. 4 is a block schematic diagram of another embodiment of a signal processor in accordance with the invention; and FIG. 5 is a block diagram showing the steps of a method in accordance with the invention.

DESCRIPTION OF THE PREFERRED EMBODIMENTS

The control system of the present invention is utilized to control the thrust output of a multi-spool turbofan engine, and a typical twin spool turbofan engine is shown in FIG. 1. The engine 10, as shown in FIG. 1, includes a low-speed spool 12, sometimes referred to as a fan spool, and a high-speed spool 14. The low-speed spool drives a fan 16 which, in a high bypass ratio engine such as the one shown in FIG. 1, provides a large proportion of the total thrust of the engine. The portion of total engine thrust not provided by the fan 16 is provided by the engine's hot gas exhaust, and both the high-speed and the low-speed spools contribute to the thrust provided by the engine's hot gases.

As shown, the low-speed spool includes a compressor section 18 and a turbine section 20, while the high-speed spool similarly includes a compressor section 22 and a turbine section 24. Most of the inlet air taken in at the front of engine 10 is exhausted through a fan duct 26 in the form of bypass air. The rest of the inlet air is compressed first by compressor 18 and then by compressor 22, and then becomes hot air as it is exposed, in a combustion chamber 28, to burners 30. Fuel is fed to the burners 30 through fuel inlet orifices 32, and fuel flow is controlled by one or more fuel rate controllers 34 (see FIG. 2). The fuel controller 34 may be either a part of or remote from the engine 10. Of course, increasing the rate of fuel flow to the engine will, within limits, increase the energy imparted to the hot gases.

After passing through the combustion chamber 28 the hot gases are expanded through the turbines 20 and 24 and finally exhausted at the rear of the engine to provide the engine's hot air thrust. The function of turbine 24 is to drive the high-speed spool and thereby rotate the compressor 22. Turbine 20 similarly drives the low-speed spool to rotate both the compressor 18 and the fan 16.

The total thrust output of engine 10 is dependent on the rate of fuel flow to the burners 30, and an increase in the rate of fuel flow increases both the fan thrust and the hot air thrust of the engine. A greater fuel flow increases the hot air thrust because of the increased energy of the hot air exhaust, and increases the fan thrust because of a corresponding increase in the rotational speed of the low-speed spool. Although there is no mechanical coupling between the high-speed and the low-speed spools there is a very significant aerodynamic coupling between the two spools; and this results in a direct and predictable functional relationship, during steady state operation, between the rotational speed $N_2$ of the high-speed spool and the rotational speed $N_1$ of the low-speed spool. That is to say, there will be a mathematically defined relationship between $N_1$ and $N_2$ during steady state engine operation for a given range of fuel flow rates provided mach number, altitude and inlet temperature are held relatively constant.

However, because the inertia of the high-speed spool 14 of engine 10 is significantly less than the inertia of the low-speed spool 12 this direct relationship between $N_1$ and $N_2$ does not hold true while the thrust output of the engine is changing, i.e. during non-steady state operation; and the high-speed spool responds much more quickly to changes in the fuel flow rate. Therefore, the rotation of the high-speed spool stabilizes much more quickly than does the rotation of the low-speed spool, and the rate of change of high-speed spool rotational speed is a predictor of changes in actual engine thrust.

Although the rotational speed $N_2$ of high-speed spool 14 is relatively stable it does not, during non-steady state operation, provide a sufficiently accurate indication of the total thrust output of engine 10. This is at least partly because of the fact that in a high bypass turbofan engine of the type shown in FIG. 1 a very large part of the total thrust provided by the engine depends on the low-speed spool. The low-speed spool 12 not only rotates the fan 16 to provide fan thrust but also rotates the compressor 18 and thereby contributes to the hot air thrust of the engine.

Certain pressure-related parameters do, on the other hand, provide a more accurate measure of the actual total thrust of a high bypass ratio turbofan engine during non-steady state operation. For example, the engine pressure ratio (EPR) of such an engine is a parameter which provides an indication of total thrust output during both steady state and non-steady state operation which is sufficiently accurate for most purposes; and another such parameter is integrated engine pressure ratio. Both EPR and IEPR are parameters commonly used in the art and are defined as:

$$EPR = \frac{P_3}{P_1} \text{ and}$$
$$IEPR = \frac{\int [KP_3 + (1-K)P_2]}{P_1}$$

where $P_1$ is the engine inlet pressure, $P_2$ is the engine pressure after the fan, and $P_3$ is the engine tailpipe pressure, all as shown in FIG. 1. As used in the formula for IEPR, the constant K has a value greater than zero but less than one; and a particular value of K is determined for each engine being considered. While it is recognized that other pressure-related engine parameters may also be adequate indicators of engine thrust in the context of the present invention, these two parameters are known to be suitable.

Referring now to FIG. 2, a control system in accordance with the present invention is shown in schematic form; and for purposes of the following description of this schematic diagram it will be assumed that the parameter being utilized to monitor engine thrust is EPR.

A power level control 36 may be manipulated by an operator such as, for example, by the pilot of a jet aircraft and set for a desired total thrust output from the engine 10. The power level control 36 provides an output signal in the form of a commanded thrust signal $T_C$ which corresponds to the setting of the power level control. Sensors 40 are provided for monitoring the mach number of the aircraft (relative speed of engine 10), the inlet temperature of the engine, the RPM of the high-speed spool, values of $P_1$, and values of $P_3$.

Signals 41 representing the mach number of the aircraft, the inlet total temperature of the engine, and the value of total pressure $P_1$ respectively are generated by the sensors 40 and received by a rating computer 42 which also receives the output signal $T_C$. The rating computer includes logic circuitry for processing the three signals received from the sensors together with the signal $T_C$ and generating a signal $P_C$ which represents a commanded value of EPR corresponding to the setting of power level control 36 taking into account the aircraft mach number and the inlet temperature and pressure of the engine. It will be appreciated, of course, that the signals from the sensors and the signal from control 36 are constantly monitored by the rating computer 42 so that the signal $P_C$ continuously reflects the commanded value of EPR in response to these signals.

The signal $P_C$ is received by a signal processor 44 which also receives a signal $N_2$ representing the actual RPM of the high-speed spool 14 of engine 10. A pressure sensor logic 46 generates a signal $P_A$ in response to signals 47 from the sensors which represent values of $P_1$ and $P_3$. The signal $P_A$ represents the actual value of EPR for engine 10, and the signal $P_A$ is monitored by logic circuitry internal to the signal processor 44. As with signal $P_C$, the signal $P_A$ is generated continuously in response to signals from the sensors, and the signal $P_A$ therefore continues to represent current values actual EPR.

The logic circuitry of the signal processor is responsive to the signals $P_C$, $N_2$, and $P_A$ for generating an error signal E which is in turn received by the fuel controller 34, and the fuel controller regulates the rate of fuel flow to engine 10 continuously as a function of the value of signal E. Changes in the thrust output of engine 10 are therefore controlled by the error signal E inasmuch as thrust will be determined by the rate of fuel flow to the engine. It will, of course, be understood that the sensors 40, the rating computer 42, the signal processor 44, and the pressure sensor logic 46 may be combined with one another in various ways so that the necessary functions will be performed by a single device or by two, three or four separate devices.

Thus, with the control system just described, changes in engine thrust are affected by a feedback loop from sensors associated with the engine. This feedback loop includes both an error loop, which provides inputs of actual EPR values for comparison with the commanded value $P_C$, and a stabilizing loop which provides values of the actual RPM of the high-speed spool. By monitoring actual values of both EPR and $N_2$ in this way the control system according to the present invention provides some measure of both the accuracy of the former and the stability of the latter.

If it is preferred to use IEPR in place of EPR in the control system just described it is merely necessary to modify the pressure sensor logic and the logic of the rating computer, and to sense values of $P_2$ as well as the values of $P_1$ and $P_3$. In a similar manner the control system could be modified to utilize any other appropriate pressure-related parameter.

The signal processor 44 in the control system of FIG. 2 may take one of several possible forms. The presently-preferred form of a signal processor to be utilized in accordance with the present invention is shown in FIG. 3 as signal processor 44a, and another preferred form is shown as signal processor 44b in FIG. 4.

In FIG. 3 the signal processor 44a includes a first signal comparison network 48 which may take the form of an operational amplifier, a signal integrator 49, and a second signal comparison network 50 which may also take the form of an operational amplifier. The first signal comparison network 48 receives signals $P_C$ and $P_A$ and generates a difference signal 52 representing the difference between the two signals. The difference signal 52 is received by the integrator 49; and the integrated difference signal 54 is received, together with the signal representing actual values of $N_2$, the second signal comparison network 50. The comparison network 50 determines the difference between these two signals and generates an error signal as a function of this difference.

With regard to the signal processor 44a of FIG. 3 as just described it should be noted that the signal $N_2$ is one time derivative removed from the difference signal 54. That is, the signal $N_2$ represents real-time values of the rotational speed of the high-speed spool 14 whereas the signal 54 represents the difference between actual and commanded values of EPR (or an equivalent parameter) which are integrated once with respect to time. In terms of a theoretical analysis it would be equivalent to differentiate the signal $N_2$ once with respect to time rather than integrating the difference signal 52.

The signal processor 44b, shown in FIG. 4, includes a signal summing network 56 which may take the form of an operational amplifier, and a signal differentiator 58. The signal differentiator 58 receives signal $N_2$ and generates a signal 60 representing the differentiated value of signal $N_2$. The network 56 receives the signal 60 together with signals $P_C$ and $P_A$, and generates an error signal representing the sum of the three signals. Once again, the signal 60 is one time derivative removed from the signals $P_A$ and $P_C$.

It should also be noted, with regard to the signal processors of both FIGS. 3 and 4, that the signals $N_2$ and 60 could be processed so as to be more than one time derivative removed from the signals $P_A$ and $P_C$, and it is believed that the control system in such a case would function in substantially the same manner as where the signals were only one time derivative removed from one another.

In operation, the control system shown in FIGS. 2 and 3, using EPR as the parameter for measuring engine thrust, functions substantially as follows. During steady state operation of the engine 10 the signal $T_C$ from power level control 36 will be held constant; and signals 41, 47, and $N_2$ from the sensors 40 will also remain substantially constant. As a result, all three inputs to the signal processor 44 are constant, and the error signal E to the fuel controller 34 will remain constant. Under these conditions the rate of fuel flow to the engine 10 will be held constant by the fuel controller, and the thrust output of the engine will be maintained at a constant level.

However, when a non-steady state condition of the engine is created, as for example when the pilot increases the level setting of the thrust control lever of an aircraft, the level of signal $T_C$ increases. In response to this change in signal $T_C$, the rating computer increases the level of signal $P_C$ representing the commanded value of EPR. Since the rating computer is continuously compensating in response to signals 41 from the sensors, the signal $P_C$ will always represent a value of EPR closely corresponding to the desired or commanded engine thrust.

Initially the signals $P_A$ and $N_2$ will remain unchanged, and the comparison network 48 will therefore generate a difference signal 52 representing a difference between signals $P_C$ and $P_A$. The signal 52 is integrated by signal integrator 49, and the integrated difference signal 54 is received by comparison network 50. Since the signal 54 is no longer zero and the signal $N_2$ has not changed, the error signal must increase to reflect the new difference between signals 54 and $N_2$. This change in the error signal causes the fuel controller to provide a corresponding increase in the rate of fuel flow to the engine for increasing thrust.

In response to this increased rate of fuel flow the rotational speeds of both spools will increase, but not necessarily at the same rate. As previously stated, the high-speed spool RPM ($N_2$) increases at a more rapid rate than does the thrust or the value of the parameter EPR. Therefore, the initial difference reflected in the error signal will be relatively great, but this difference will rapidly become damped by the $N_2$ signal as the rotational speed of the high-speed spool increases. Although the signal $N_2$ will continue to increase in response to increases in the rotational speed of the high-speed spool until the difference between $P_C$ and $P_A$ approaches zero, the magnitude of this increase will diminish as the error signal approaches a level representing a fuel flow rate consistent with the commanded level of thrust. When the proper level of fuel flow rate has been reached the engine is once again operating under steady state conditions, and the error signal will be maintained at a level dictated by signal $N_2$.

A method in accordance with the invention is shown in block-diagram form in FIG. 5. The steps of the method depicted in FIG. 5 are consistent with the foregoing description made in connection with the thrust control system of the invention, and no additional detailed description will therefore be provided. It will be understood in connection with the method, however, that the $N_2$ signal will preferably be at least one time derivative removed from both the actual and the commanded EPR signals, and that wherever EPR is specified in FIG. 5, IEPR or some other suitable pressure-related parameter could be substituted therefore.

Both the control system and the method of the present invention therefore provide accurate and stable thrust control for a turbofan engine in response to commanded changes in total thrust output for the engine, and this same degree of combined accuracy and stability of control was not previously practical.

It will be readily appreciated by one of ordinary skill in the art that the power level control, the sensors, and the fuel controller utilized by the present invention are all standard components readily available from several commercial sources. The rating computer will normally take the form of an electronic mini-computer, and the logic of the control system will preferably be implemented through the use of solid state electronic components although hydromechanical components could also be utilized.

Thus the foregoing description of our invention discloses preferred embodiments thereof, and various changes in form or detail may be made within the scope of the invention which is defined and limited only by the following claims.

What is claimed is:

1. In a multi-spool turbofan engine including a high-speed spool, a control system for providing stabilized changes in engine thrust corresponding to changes in the setting of a power level control; said control system comprising:

means responsive to the setting of said power level control for generating a command signal representing a commanded thrust in terms of a corresponding commanded value of a pressure-related parameter;

engine sensors connected to said engine for monitoring an actual value of said parameter and the rotational speed of said high-speed spool;

a feedback loop including an error loop and a stabilization loop, said error loop and said stabilization loop responsive to said engine sensors for reflecting an actual value of said parameter and a rate of change of said rotational speed respectively;

a signal processor responsive to said command signal and to said feedback loop for generating an error signal; and a fuel-rate controller responsive to said error signal for controlling the rate of fuel flow to said engine.

2. In a multi-spool turbofan engine as claimed in claim 1 wherein said parameter is engine pressure ratio.

3. In a multi-spool turbofan engine as claimed in claim 1 wherein said parameter is integrated engine pressure ratio.

4. In a multi-spool turbofan engine including a high-speed spool, a control system for controlling the thrust of the engine in response to the setting of a power level control; said control system comprising:

means for sensing the values of selected engine pressures and generating an engine pressure signal in response to said values which represents the actual thrust of said engine;

means responsive to the setting of said power level control for generating a command signal representing a commanded thrust for said engine corresponding to said setting;

means for sensing the rotational speed of said high-speed spool and generating a speed signal representing said rotational speed;

a signal processor responsive to said engine pressure signal, said command signal, and said speed signal for generating an error signal which is a function of all three said signals; and a fuel-rate controller responsive to said error signal for controlling the rate of fuel flow to said engine.

5. In a multi-spool turbofan engine as claimed in claim 4 wherein said control system includes means for sensing the relative speed, inlet temperature, and inlet pressure of said engine and generating input signals representative thereof, said means responsive to the setting of said power level control comprising a rating computer responsive to said input signals for generating said command signal.

6. In a multi-spool turbofan engine as claimed in claim 5 wherein said control system includes means for converting said selected engine pressure values to EPR, and wherein said engine pressure signal and said command signal represent an actual and a commanded EPR respectively for said engine.

7. In a multi-spool turbofan engine as claimed in claim 5 wherein said control system includes means for converting said selected engine pressure values to IEPR, and wherein said engine pressure signal and said command signal represent an actual and a commanded IEPR respectively for said engine.

8. A control system responsive to changes in the setting of a power level control for providing corresponding stabilized changes in the thrust of a multi-spool turbofan engine having a high-speed spool, said control system comprising:

means for sensing the actual values of selected engine pressures and generating a corresponding first signal representing the actual value of a parameter derived from said selected engine pressures, said parameter providing an accurate measure of engine thrust;

means responsive to the setting of said power level control for generating a second signal representing a commanded value of said parameter corresponding to said power level control setting;

means for sensing the rotational speed of said high-speed spool and generating a third signal representing said rotational speed;

a signal processor responsive to said first, second, and third signals for generating an error signal which is a function of all three said signals; and a fuel controller responsive to said error signal for controlling the flow of fuel to said engine and thereby controlling changes in engine thrust.

9. A control system as claimed in claim 8 wherein said signal processor comprises means for providing fourth, fifth, and sixth signals and determining the sum thereof; said fourth, fifth, and sixth signals functions of said first, second, and third signals respectively with said sixth signal at least one time derivative removed from said fourth and fifth signals; and said error signal representing said sum.

10. A control system as claimed in claim 8 or claim 9 wherein said parameter is engine pressure ratio.

11. A control system as claimed in claim 8 or claim 9 wherein said parameter is integrated engine pressure ratio.

12. A control system as claimed in claim 8 wherein said signal processor comprises:

a first signal comparison netwok for receiving said first and second signals and generating a difference signal representing the difference therebetween, and a second signal comparison network responsive to both said difference signal and said third signal for generating said error signal as a function thereof.

13. A control system as claimed in claim 12 wherein said third signal is at least one time derivative removed from said difference signal.

14. A control system as claimed in claim 12 or claim 13 wherein said parameter is engine pressure ratio.

15. A control system as claimed in claim 12 or claim 13 wherein said parameter is integrated engine pressure ratio.

16. A control system as claimed in claim 8 wherein said signal processor comprises:

a first signal comparison network for receiving said first and second signals and generating a difference signal representing the difference therebetween, means for integrating said difference signal, and a second signal comparison network responsive to both the integrated difference signal and said third signal for generating said error signal as a function thereof.

17. A control system as claimed in claim 8 wherein said signal processor comprises:

means for differentiating said third signal, and a signal summing network for receiving said first signal, said second signal, and the differentiated third signal and generating said error signal, said error signal representing the sum of said first signal, said second signal, and said differentiated third signal.

18. A control system as claimed in claim 16 or claim 17 wherein said parameter is engine pressure ratio.

19. A control system as claimed in claim 16 or claim 17 wherein said parameter is integrated engine pressure ratio.

20. A method for providing stabilized changes in the thrust output of a multi-spool turbofan engine corresponding to changes in the setting of a power level control for said engine, said method comprising the steps of:

sensing the actual values of selected engine pressures and generating a corresponding first signal representing the actual value of a parameter derived from said selected engine pressures and providing an accurate measure of engine thrust;

generating a second signal representing a commanded value of said parameter which corresponds to the setting of said power level control;

sensing the rotational speed of the high-speed spool of said engine and generating a third signal representing said rotational speed;

generating an error signal in response to said first, second, and third signals as a function of all three said signals; and controlling the rate of fuel flow to said engine as a function of said error signal and thereby controlling changes in engine thrust.

21. A method for providing stabilized changes in the thrust output of a multi-spool turbofan engine as claimed in claim 20 wherein said parameter is engine pressure ratio.

22. A method for providing stabilized changes in the thrust output of a multi-spool turbofan engine as claimed in claim 20 wherein said parameter is integrated engine pressure ratio.

23. A method for providing stabilized changes in the thrust output of a multi-spool turbofan engine corresponding to changes in the setting of a power level control for said engine, said method comprising the steps of:

sensing the actual values of selected engine pressures and generating a corresponding first signal representing the actual value of a parameter derived from said selected engine pressures and providing an accurate measure of engine thrust;

generating a second signal representing a commanded value of said parameter which corresponds to the setting of said power level control;

generating a difference signal representing the difference between said first and second signals;

sensing the rotational speed of the high-speed spool of said engine and generating a third signal representing said rotational speed and at least one time derivative removed from said difference signal;

generating an error signal representing a comparison between said difference signal and said third signal; and controlling the rate of fuel flow to said engine as a function of said error signal and thereby controlling changes in engine thrust.

24. A method for providing stabilized changes in the thrust output of a multi-spool turbofan engine as claimed in claim 23 wherein said parameter is engine pressure ratio.

25. A method for providing stabilized changes in the thrust output of a multi-spool turbofan engine as claimed in claim 23 wherein said parameter is integrated engine pressure ratio.

26. A method for providing stabilized changes in the thrust output of a multi-spool turbofan engine corresponding to changes in the setting of a power level control for said engine, said method comprising the steps of:

sensing the actual values of selected engine pressures and generating a corresponding first signal representing the actual value of a parameter derived from said selected engine pressures and providing an accurate measure of engine thrust;

generating a second signal representing a commanded value of said parameter which corresponds to the setting of said power level control;

sensing the rotational speed of the high-speed spool of said engine and generating a third signal representing said rotational speed;

differentiating said third signal;

generating an error signal representing the sum of said first signal, said second signal, and the differentiated third signal; and controlling the rate of fuel flow to said engine as a function of said error signal and thereby controlling changes in engine thrust.

27. A method for providing stabilized changes in the thrust output of a multi-spool turbofan engine as claimed in claim 26 wherein said parameter is engine pressure ratio.

28. A method for providing stabilized changes in the thrust output of a multi-spool turbofan engine as claimed in claim 26 wherein said parameter is integrated engine pressure ratio.

* * * * *